(12) United States Patent
Sato

(10) Patent No.: US 6,414,948 B1
(45) Date of Patent: Jul. 2, 2002

(54) ELECTRIC POWER CONTROLLING SYSTEM FOR VARIABLE BIT RATE CDMA TRANSMISSION AND MOBILE TELEPHONE SYSTEM

(75) Inventor: Toshifumi Sato, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/099,593

(22) Filed: Jun. 18, 1998

(30) Foreign Application Priority Data

Jun. 20, 1997 (JP) .............................................. 9-163577

(51) Int. Cl.[7] .............................................. H04B 7/216
(52) U.S. Cl. ...................................... 370/335; 370/342
(58) Field of Search ................................. 370/320, 332, 370/334, 335, 341, 342; 375/377, 222

(56) References Cited

U.S. PATENT DOCUMENTS

| | | | | |
|---|---|---|---|---|
| 5,974,042 A | * | 10/1999 | Frank et al. ................. | 370/342 |
| 5,978,428 A | * | 11/1999 | Hayashi ....................... | 375/377 |
| 6,029,268 A | * | 2/2000 | Kong et al. .................. | 714/795 |
| 6,094,428 A | * | 7/2000 | Bruckert et al. ............ | 370/335 |
| 6,157,626 A | * | 12/2000 | Nakamura et al. .......... | 370/328 |
| 6,163,705 A | * | 12/2000 | Miya ............................ | 455/522 |

FOREIGN PATENT DOCUMENTS

| | | |
|---|---|---|
| JP | 5102943 | 4/1993 |
| JP | 6-501349 | 2/1994 |
| JP | 6209274 | 7/1994 |
| JP | 7273722 | 10/1995 |
| JP | 8130535 | 5/1996 |

OTHER PUBLICATIONS

Office Action Issued by The Japanese Patent Office on Nov. 17, 1998 for the Corresponding Japanese Application.

* cited by examiner

Primary Examiner—Wellington Chin
Assistant Examiner—Brenda Pham
(74) Attorney, Agent, or Firm—Dickstein, Shapiro, Morin & Oshinsky, L.L.P.

(57) ABSTRACT

According to the invention, a transmission quality is not deteriorated and, when a system is applied to a variable bit transmission, a high-precision transmission electric power control can be executed. An Eb/Io calculating circuit calculates and Eb/Io value of a signal electric energy per bit Eb and an interface electric power per Hz Io from a reception base-banding signal from a radio receiving unit for every bit rate. A maximum value detecting unit detects a maximum value from the Eb/Io values. The maximum Eb/Io value is compared with a target Eb/Io value by a comparing unit and a transmission electric power control bit for allowing the transmission electric power to be decreased when the maximum Eb/Io value is larger than the target Eb/Io value and, in the case contrary to the above, for allowing the transmission electric power to be increased. The transmission electric power control bit is sent to a multiplexing unit. The bit and transmission data are multiplexed. The multiplexed data is modulated, its frequency is converted, and the resultant data is transmitted at an electric power based on the TPC bit by a radio transmitting unit.

21 Claims, 9 Drawing Sheets

ELECTRIC POWER CONTROLLING SYSTEM FOR VARIABLE BIT RATE CDMA TRANSMISSION AND MOBILE TELEPHONE SYSTEM

BACKGROUND OF THE INVENTION

1. Field of the Invention

The present invention relates to an electric power controlling system for variable bit rate CDMA transmission which is applied to a mobile telephone system (cellular mobile telephone system) or the like using a direct spread code-division multiple accessing (DS-CDMA) system. More particularly, the invention relates to an electric power controlling system for variable bit rate CDMA transmission in which a plurality of bit rates are switched, and a mobile telephone system adopting the system.

2. Description of the Prior Arts

Hitherto, as a mobile telephone system of this kind adopting the direct spread code-division multiple accessing (DS-CDMA) system, IS-95 Standard of North American Standards TIA/EIA is widely known. In the IS-95 Standard, at the time of a reverse link from a mobile terminal as a transmitting side to a base station as a receiving side, one of four kinds of bit rates of 9.6 kbps, 4.8kbps, 2.4 kbps, and 1.2 kbps is selected for transmission. When 9.6 kbps is set to a basic rate and data is transmitted at bit rates of ½, ¼, and ⅛ of the basic rate, the variable rate transmission is executed in such a manner that transmission data is thinned to ½, ¼, and ⅛, respectively, and the resultant data is transmitted.

That is, one frame (20 msec) is divided into 16 slots each having an interval of 1.25 msec and, when data is transmitted at the basic rate of 9.6 kbps, the data is transmitted with all of 16 slots. In case of the bit rate of 2.4 kbps, 2.4 kbps, or 1.2 kbps, data is transmitted with only 8, 4, or 2 slots per one frame and transmission of other slots is stopped. In the method, the slot transmission is merely turned ON/OFF and a transmission electric power does not depend on the bit rate.

In the reverse link in the cellular mobile telephone system adopting the CDMA system, it is necessary to control a transmission electric power of a mobile terminal so that reception electric powers from respective mobile terminals such as a mobile telephone, and an information terminal are equalized. Particularly, in case of the variable bit rate system in which a bit rate of the mobile terminal dynamically changes, it is necessary to execute a control to equalize a reception electric power per information of one bit.

A control of the transmission electric power in the reverse link in OS-95 Standard will now be explained.

Since the base station cannot previously know a bit rate at which the mobile terminal transmits, the base station compares the reception electric power with a reference value for all slots and instructs the mobile terminal to increase or decrease the transmission electric power so that the reception electric power coincides with the reference value. The mobile terminal is controlled in accordance with only the instruction of the base station for the slots which have actually been transmitted and ignores the instruction to slots which have not been transmitted.

As mentioned above, in the transmission electric power control by the variable bit rate CDMA system, only the turn ON/OFF on a slot unit basis whereby the transmission electric power control is executed can be performed. Since the selection of bit rates is limited, an intra-frame interleave is restricted at a low bit rate, so that an effect of an error correction coding process is reduced. Therefore, since intervals of slots in which the reception electric power can be measured is widened, the control for the transmission electric power cannot follow a fast fading, so that its transmitting characteristics deteriorate. Since a burst transmission is executed, a hazard noise occurs. In this case, there is such a problem that an erroneous operation occurs due to the noise in, for example, a hearing aid or medical instruments located nearby.

On the other hand, in a forward link serving as an operation from the transmission of the base station to the reception of the mobile terminal of IS-95 Standard as well, the transmission in which one of the four kinds of bit rates of 9.6 kbps, 2.4 kbps, 2.4 kbps, and 1.2 kbps is selected can be similarly executed. However, it is different from a realizing method for the variable bit rate of the reverse link. In the forward link, the low bit rate is not realized by turning ON/OFF the transmission on a slot unit basis, namely, thinning in a manner similar to the reverse link. But, for example, in case of 4.8 kbps as shown in FIG. 1, the transmission electric power per one time is controlled to ½ instead of executing the transmission by repeating the same bit twice.

Similarly, in case of the bit rates of 2.4 kbps and 1.2 kbps, the electric powers per one time are set to ¼ and ⅛, respectively, instead of repeating the same bit four times and eight times, respectively. By the above-mentioned process, the transmission electric power per one bit can be held to be constant. In the variable bit rate processing method for the forward link as mentioned above, the problems involved in the reverse link as explained above, namely, a deterioration in characteristics due to the restriction of the interleave and hazard noise caused by with the burst transmission can be solved. However, since the transmission electric power is dynamically changed depending upon the bit rate in use, it is difficult to control the transmission electric power without previously knowing the bit rate so that the reception electric power per 1-bit information is equalized.

The reason why the realizing method for the variable bit rate for the forward link is different from that for the reverse link in IS-95 Standard is that the forward link uses a method in which it is unnecessary to execute a high-speed transmission electric power control and in which a deterioration in characteristics is small.

As such examples, "Spread Spectrum Transmitting Method" disclosed in Japanese Patent Application Laid-Open No. 5-102943 (1993) and "Transmission Bit Rate Discriminating Method and Apparatus" disclosed in Japanese Patent Application Laid-Open No. 8-130535 (1996) are known. In Japanese Patent Application Laid-Open No. 5-102943 (1993), a variable bit rate transmitting and receiving method similar to that for the forward link in IS-95 Standard is disclosed but the above-described problems associated with the transmission electric power control are difficult to solve.

Further, in Japanese Patent Application Laid-Open No. 5-102943 (1993), an improvement in the determination of the transmission bit rate in the variable bit rate system is shown. However, since the bit rate can be determined only after completion of the reception of a reception signal of one frame (20 msec in IS-95 Standard), such transmission electric power control as executed for every slot (1.25 msec in IS-95 Standard)is not applicable. Similarly, as a method of determining a bit rate after completion of the reception of a reception signal of one frame, a method of comparing a likelihood when a CRC check is executed at a plurality of bit rates or when a maximum likelihood decode is performed to a convolution code by a Viterbi algorithm or the like is known. In this case, however, a timing of the transmission electric power cannot be processed.

In order to solve the problem of the variable bit rate transmitting system for the reverse link in IS-95 Standard, namely, a deterioration in transmitting characteristics caused by delays of the control for the interleave and control for the transmission electric power, there has been also proposed another variable bit rate transmission method for transmitting only part of slots without turning ON/OFF the transmission on a slot unit basis on which the transmission electric power controlled is executed in a manner similar to that in the reverse link of IS-95 Standard. For example, a method of transmitting a frame which is transmitted at a bit rate that is ½ of the basic rate by using the whole slot in such a manner that the transmission of only the former half of one slot is ON and that of the latter half is OFF.

In the variable bit rate transmitting method, since ON time per slot for transmission changes depending upon the bit rate, a measuring method for the reception of electric power is restricted. For example, when the reception electric power is measured during only intervals in which the transmission is ON at even the lowest bit rate, it is possible to prevent measurement of the reception electric power at intervals in which the transmission is OFF. However, there is a problem that the measurement interval is shortened, so that a measurement precision is deteriorated.

As mentioned above, in the conventional methods, in the variable bit rate for transmission wherein the transmission ON/OFF is effected on a slot unit basis as in the reverse link in IS-95 Standard, its transmitting characteristics are deteriorated.

In a variable bit rate transmitting method wherein changing a diffusion rate is changed in correspondence to the bit rate and simultaneously the transmission electric power is changed in inverse proportion to the diffusion rate, as in the forward link in IS-95 Standard, it is difficult to measure the reception electric power or a reception quality per 1-bit information. For example, in a method in which the diffusion rate is set to be twice as large as that of the basic rate and the transmission electric power is set to ½ of that of the basic rate in a frame in which data is transmitted at a bit rate of ½ of the basic rate.

In the variable bit rate transmission with only parts of the slots, for example, the method of transmitting a frame in which data is transmitted at a bit rate of ½ of the basic rate for the whole slot in such a manner that the transmission of only the former half of one slot is ON and that of the latter half is OFF, the measuring interval of the reception electric power is restricted, with the result that its measurement precision deteriorates.

SUMMARY OF THE INVENTION

The present invention has been made in consideration of the above points and it is the first object of the invention to provide a variable bit rate CDMA transmission electric power control system in which the transmission electric power is controlled at a high precision when it is applied to a variable bit rate transmitting method of transmitting data in such a manner that a transmission quality is not deteriorated, a spread factor is changed depending upon a bit as selected, and a transmission electric power is changed in inverse proportion to the spread factor and a variable bit rate transmission for transmitting only parts of slots depending upon a bit rate in use.

The second object of the invention is to provide a mobile telephone system adopting the CDMA transmission electric power controlling system according to the invention.

In order to accomplish the above objects, according to the invention, there is provided a variable bit rate CDMA transmission electric power controlling system for switching a plurality of bit rates in transmission wherein reception quality is estimated for transmission bit rates obtained from a reception base-band signal and a transmission electric power is controlled on the basis of the reception quality thus estimated.

According to the invention, the reception quality is estimated by measuring an Eb/Io value that is a ratio of a signal electric energy per bit Eb to an interference electric power per Hz Io value for the plurality of bit rates obtained from a reception base-band signal, obtaining a maximum value of the Eb/Io value, and a transmission electric power is controlled on the basis of the maximum value of the Eb/Io value.

Further, according to the invention, a variable bit rate CDMA transmission electric power controlling system comprises reception processing means for converting a reception signal to output a reception base-band signal; Eb/Io calculating means for calculating an Eb/Io value that is a ratio of a signal electric energy per bit Eb to an interference electric power per Hz Io for every bit rate in use; maximum value detecting means for detecting a maximum value of the Eb/Io values for all bit rates; comparing means for comparing the maximum Eb/Io value with a target Eb/Io value to produce a transmission electric power control bit instructing so that when the maximum Eb/Io value is large, a transmission electric power is decreased and, when the maximum Eb/Io value is small, the transmission electric power is increased; multiplexing means for multiplexing the transmission electric power control bit and transmission data to produce the resultant data; transmitting means for modulating and frequency converting multiplexed data and the transmission data for transmission; and demodulating means for demodulating and transmitting the reception base-band signal.

According to the invention, the variable bit rate CDMA transmission electric power controlling system further has as Eb/Io calculating means: a basic rate Eb/Io measuring unit for measuring an Eb/Io value for a basic rate; and a plurality of Eb/Io measuring units for calculating an Eb/Io value per one bit for remaining bit rates.

Further, according to the invention, in the variable bit rate CDMA transmission electric power controlling system, in each of the Eb/Io calculating means, maximum value detecting means, and comparing means, the transmission bit rate is changed with a frame having a time length of at least 10 msec to 80 msec as a unit and a process is executed by using a slot which is obtained by dividing one frame into a plurality of slots which have a time length of at least 0.5 msec to 2.5 msec as a unit.

According to the invention, in the variable bit rate CDMA transmission electric power control system, a spreading factor is changed depending upon the bit rate and the transmission electric power is changed in inverse proportion to the spreading factor.

Further, according to the invention, in the variable bit rate CDMA transmission electric power controlling system, the bit rate is changed within a range of one integer (N) of the basic rate by setting the maximum rate as a basic rate and, when the bit rate is equal to 1/N of the basic rate, the same data is repeated N times and is transmitted, the spreading factor is changed, and the transmission electric power is changed in inverse proportion to N.

According to the invention, in the variable bit rate CDMA transmission electric power controlling system, a time ratio in which the transmission is ON in the slot is changed in proportion to the bit rate.

Further, according to the invention, the variable bit rate CDMA transmission electric power controlling system has in order to execute the Eb/Io calculation: basic rate de-spreading unit for de-spreading the reception base-band signal; a plurality of symbol adding units for adding the number of transmission symbols repeated in correspondence to the bit rate; and a plurality of Eb/Io measuring units for measuring the Eb/Io values for the symbols added by the plurality of symbol adding units.

According to the invention, the variable bit rate CDMA transmission electric power controlling system has in order to perform the Eb/Io calculation: a de-spreading and inverse modulating unit for de-spreading the reception base-band signal and for inversely modulating the signal by using reception data, thereby eliminating a modulation component; a mean squared value unit for calculating a mean squared value of the signal from the de-spreading and inverse modulating unit in a slot interval; a plurality of mean squared value calculating units for obtaining a mean value from the signal from the de-spreading and inverse modulating unit in a transmission ON interval in the slot corresponding to the bit rate; and a plurality of Eb/Io measuring units for obtaining the Eb/Io value for every bit rate by using mean values from the mean squared value from the means squared value unit and the mean values from the plurality of mean value calculating units.

Further, according to the invention, the variable bit rate CDMA transmission electric power controlling system has as a plurality of Eb/Io measuring units: a basic rate Eb/Io measuring unit for measuring an Eb/Io value of the basic rate; a ½ rate Eb/Io measuring unit for measuring the Eb/Io value of ½ rate; a ¼ rate Eb/Io measuring unit for measuring the Eb/Io value of ¼ rate; and a ⅛ rate Eb/Io measuring unit for measuring the Eb/Io value of ⅛ rate.

According to the invention, the variable bit rate CDMA transmission electric power controlling system has as a plurality of symbol adding units: a 1-symbol adding unit for adding one symbol of a transmission repeated depending upon the bit rate from an output signal of the basic rate de-spreading unit; a 2-symbol adding unit for adding two symbols of a transmission repeated depending upon the bit rate; a 4-symbol adding unit for adding four symbols of a transmission repeated depending upon to the bit rate; and a 8-symbol adding unit for adding eight symbols of a transmission repeated depending upon the bit rate.

Further, according to the invention, the variable bit rate CDMA transmission electric power controlling system has as a plurality of mean value calculating units: a whole slot mean value unit for calculating a mean value of a whole slot interval; a ½ slot mean value unit for obtaining a ½ slot interval mean value; a ¼ slot mean value unit for obtaining a ¼ slot interval mean value; and a ⅛ slot mean value unit for obtaining a ⅛ slot interval mean value.

According to the invention, in the variable bit rate CDMA transmission electric power controlling system, the system is applied to a mobile telephone system using a direct spread code-division multiple accessing system.

With the construction according to the invention, the maximum value of the Eb/Io values measured for a plurality of bit rates obtained from the reception base-band signal is obtained and the transmission electric power control is executed.

Therefore, it is unnecessary to previously know the bit rate, so that it is possible to rapidly produce a transmission electric power control bit rate for every slot serving as a unit of the transmission electric power control. Consequently, a transmission quality is not deteriorated, a spreading factor is changed depending upon the bit rate, and when it is applied to a variable bit rate transmitting method of changing a transmission electric power in inverse proportion to a spreading factor and transmitting and a variable bit rate transmission for transmitting only parts of slots in correspondence to the bit rate, a transmission electric power control can be executed at a high precision.

In this case, in combination with the variable rate transmitting method of changing the spreading factor depending upon the bit rate, a transmitting efficiency is not deteriorated at even a low bit rate and it is possible to prevent an occurrence of hazard noise for, for example, a hearing aid or medical instruments. In combination with the variable rate transmitting method of varying ON time of a slot content depending upon the bit rate, measuring time for a reception quality can be extended, so that the precision of the transmission electric power control is improved.

DETAILED DESCRIPTION OF THE PREFERRED EMBODIMENTS

The invention will now be described hereinbelow with reference to the drawings.

Figure 1:
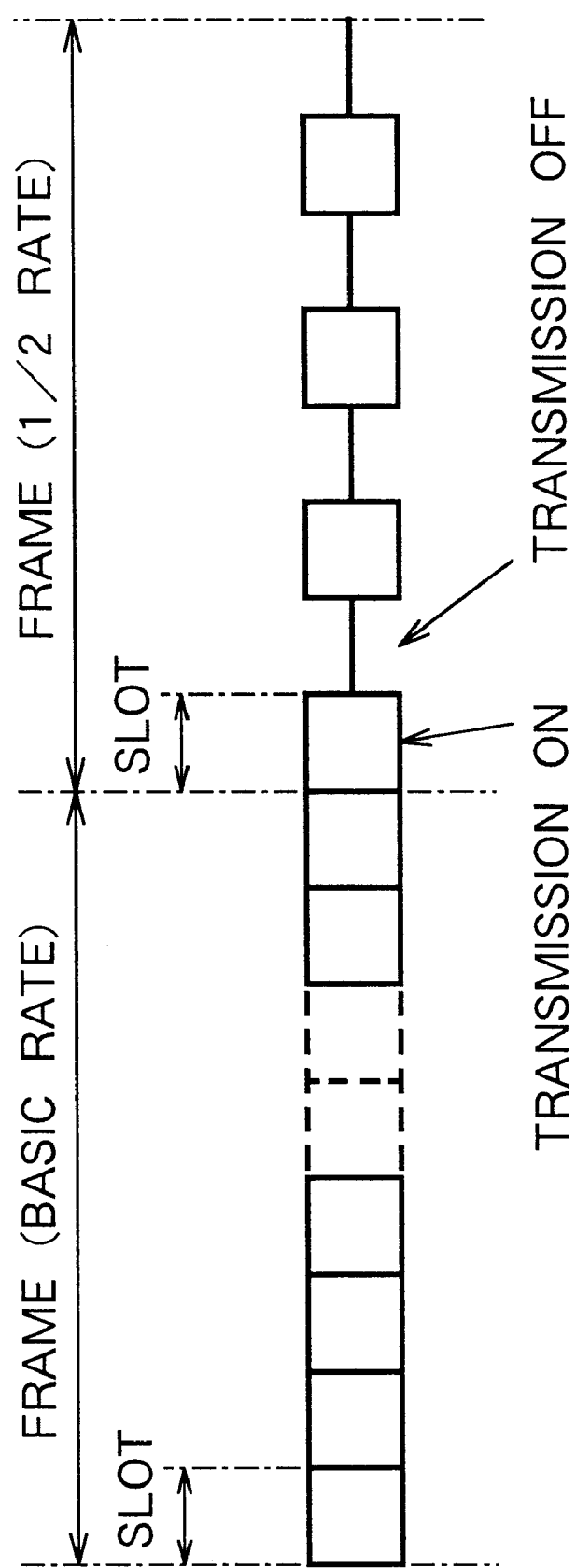
FIG. 1 is a diagram for explaining a conventional transmission electric power control.
Figure 2:
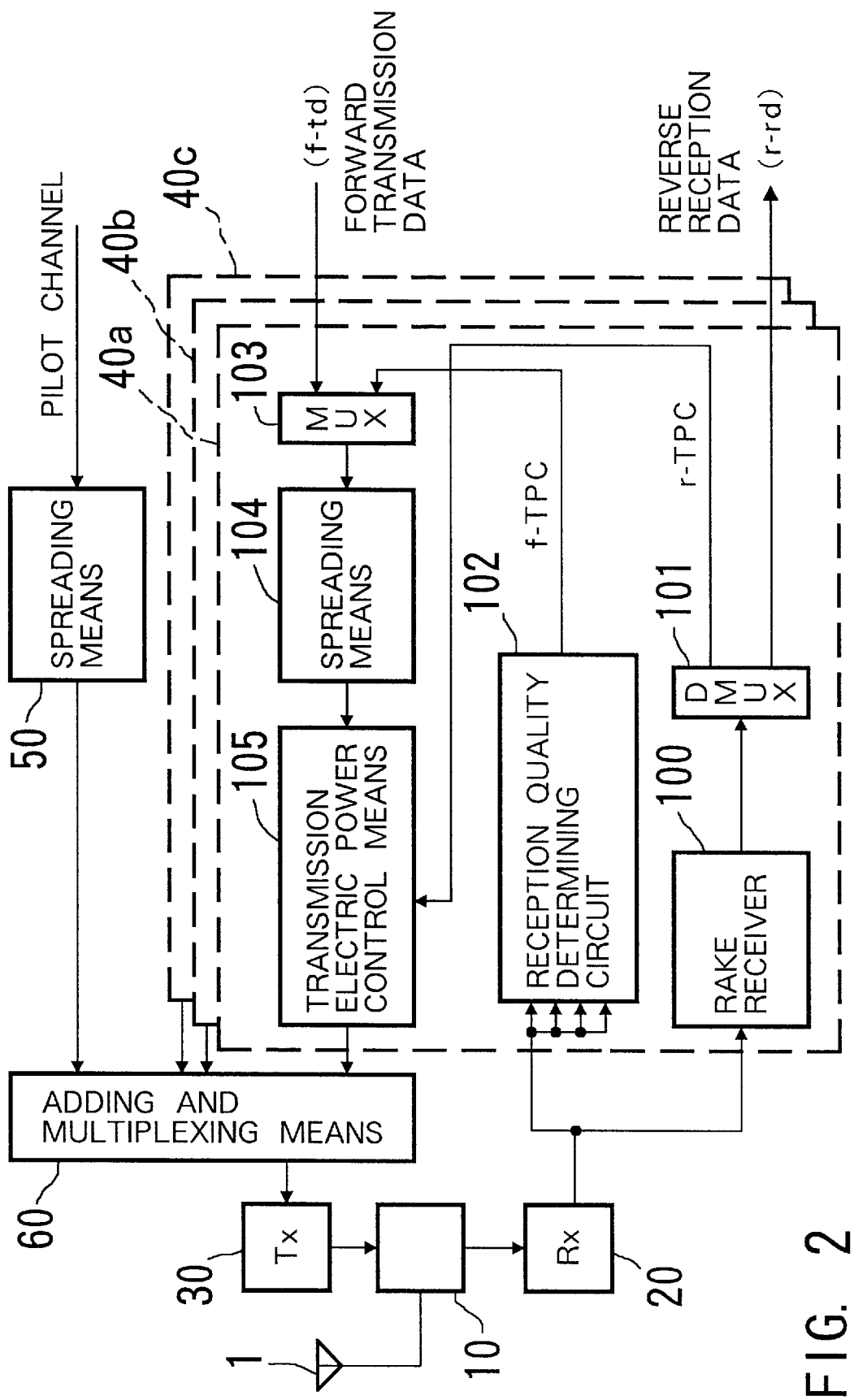
FIG. 2 is a block diagram showing a construction of a base station apparatus to which a variable bit rate CDMA transmission electric power controlling system according to the invention is applied.

FIG. 2 is a block diagram showing a construction of a base station apparatus to which is applied a variable bit rate CDMA transmission electric power controlling system according to the present invention.

The base station apparatus comprises an antenna 1 adapted to be used commonly for transmission and reception; a duplexer 10; a radio receiving unit (Rx) 20 for converting a received radio frequency signal (RF signal) to a base-band signal; a radio transmitting unit (Tx) 30 for converting the base-band signal to radio frequency signal (RF signal) as a transmission signal; a plurality of channel processing units 40*a*, 40*b*, 40*c*, . . . ; a spreader 50 which spreads a pilot channel commonly used for a plurality of mobile terminal; and an adder and multiplexor 60 which adds the transmission signals of the plurality of channels and a signal after completion of the spreading of the pilot channel and code-divide and multiplexes the resultant signal. The base station ordinarily has a plurality of channel processing units 40a, 40b, 40c, . . . in order to simultaneously communicate with the plurality of mobile terminals. The pilot channel is a signal that is used for a search of a base station located near, a chip synchronization of a reception signal, a reference signal for a synchronous detection, or the like for all of the mobile terminals.

Since the channel processing units 40a, 40b, 40c, . . . have the same circuit construction, the circuit construction of 40a is shown by way of example in the diagram.

The construction will now be explained. The unit comprises a RAKE receiver 100 for combining a plurality of de-spread base-band signals having different phases concerning multi-path propagation generated from the radio receiving unit (Rx) 20; a demultiplexing unit (DMUX) 101 for demultiplexing an output of the RAKE receiver 100; a reception quality estimation circuit 102 for estimating a reception quality of the received signal and outputting a transmission electric power instruction signal (f-TPC); a multiplexing unit (MUX) 103 for multiplexing forward transmission data (f-td) and the transmission electric power instruction signal (f-TPC) from the reception quality estimation circuit 102; a spreader means 104 which spreads the multiplexed forward transmission data; and transmission electric power control circuit 105 which controls a transmission electric power of the spread forward transmission data on the basis of an instruction signal (r-TPC) to increase or decrease a transmission electric power from the demultiplexing unit 101. The reception quality estimation circuit 102 concerns a significant portion of the invention. Its construction and operation will be described hereinafter with reference to FIGS. 4 and 8.

Figure 3:
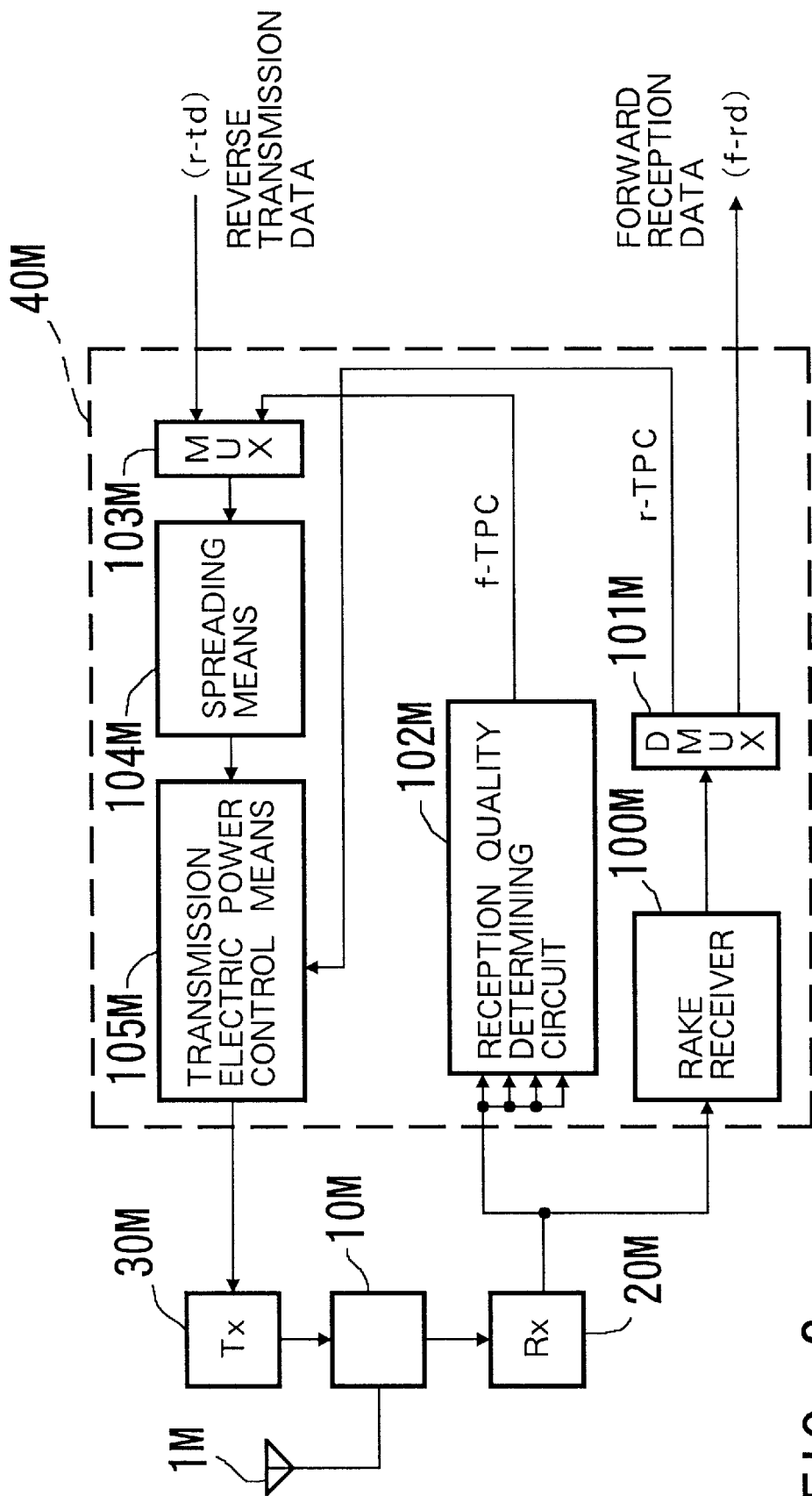
FIG. 3 is a block diagram showing a construction of a mobile machine to which the variable bit rate CDMA transmission electric power controlling system according to the invention is applied.

FIG. 3 is a block diagram showing a construction of a mobile machine to which the variable bit rate CDMA transmission electric power controlling system according to the invention is applied. In the diagram, the same reference numerals are added to component elements having the same functions as those in FIG. 2 and M added to the end of each reference numeral to indicate it is of the mobile terminal.

Since the mobile terminal ordinarily executes only the transmission and reception of one channel, the terminal has one channel processing unit 40M. In the case of a mobile terminal executing the transmission and reception of a plurality of channels, the terminal can have a plurality of channel processing units. As will be understood from the diagram, the transmission and reception data of the mobile terminal are different from those of the base station apparatus. However, since the circuit construction of the mobile terminal is substantially the same as that of the above-mentioned base station apparatus, except for the pilot channel, an explanation is omitted.

Again referring to FIG. 2, the operation of a closed loop transmission electric power control by the base station apparatus will now be described.

When a transmission electric power of reverse link (transmission from the mobile terminal to the base station) is controlled, in the reception quality estimation circuit 102 of the channel processing unit (for example, 40a) of the base station apparatus, a quality (for example, Eb/Io, which will be explained in detail hereinafter) of the reception signal is measured on the basis of the reverse link base-band signal generated by the radio receiving unit (Rx) 20. The quality value is compared with a predetermined target quality value, and a check is made to see whether the quality value is too large or too small, thereby estimating the reception quality of a signal received by the base station apparatus. Consequently, the instruction signal (f-TPC) of whether the transmission electric power of the mobile machine should be increased or decreased by one dB (decibel) is formed. This signal is multiplexed with the forward transmission data (f-td) in the multiplexing unit (MUX) 103, the resultant data is spread by the spreading means 104, and then, the resultant data 10 is transmitted from the antenna 1 to the mobile terminal via the transmission electric power control circuit 105, multiplexor 60, radio transmitting unit (Tx) 30, and antenna common device 10.

Referring to FIG. 3, the mobile terminal extracts the instruction signal (f-TPC) by demodulating by an RAKE receiver 100M and a demultiplexing unit (DMUX) 101M, and transmits the signal as a transmission electric power instruction signal (r-TPC) to transmission electric power control circuit 105M. The transmission electric power control circuit 105M increases or decreases the reverse transmission electric power by one dB (decibel) on the basis of the transmission electric power instruction signal (r-TPC).

When a transmission electric power of forward link (transmission from the base station to the mobile terminal) is controlled, the function of the base station apparatus and that of the mobile terminal are exactly reversed. That is, in a reception quality determining circuit 102M of the mobile terminal, a quality (for example, a value of Eb/Io) of a forward reception signal is measured on the basis of the base-band signal received from the base station apparatus, the reception quality is estimated by comparing the quality value of the signal with a predetermined target quality value and the transmission electric power instruction signal (r-TPC) of whether the transmission electric power of the base station apparatus should be increased or decreased by one dB (decibel) is produced. The instruction signal (r-TPC) is multiplexed to the reverse transmission data (r-td) by a multiplexing unit (MUX) 103M and the resultant data is transmitted from an antenna 1M to the base station apparatus.

Tuning again to FIG. 2, the base station apparatus receives the instruction signal (r-TPC) by the antenna 1, processes the signal by the channel processing unit (for example, 40a), and then, increases or decreases the transmission electric power of the forward transmission data (f-td) of the relevant channel by one dB by the transmission electric power control circuit 105.

Figure 4:
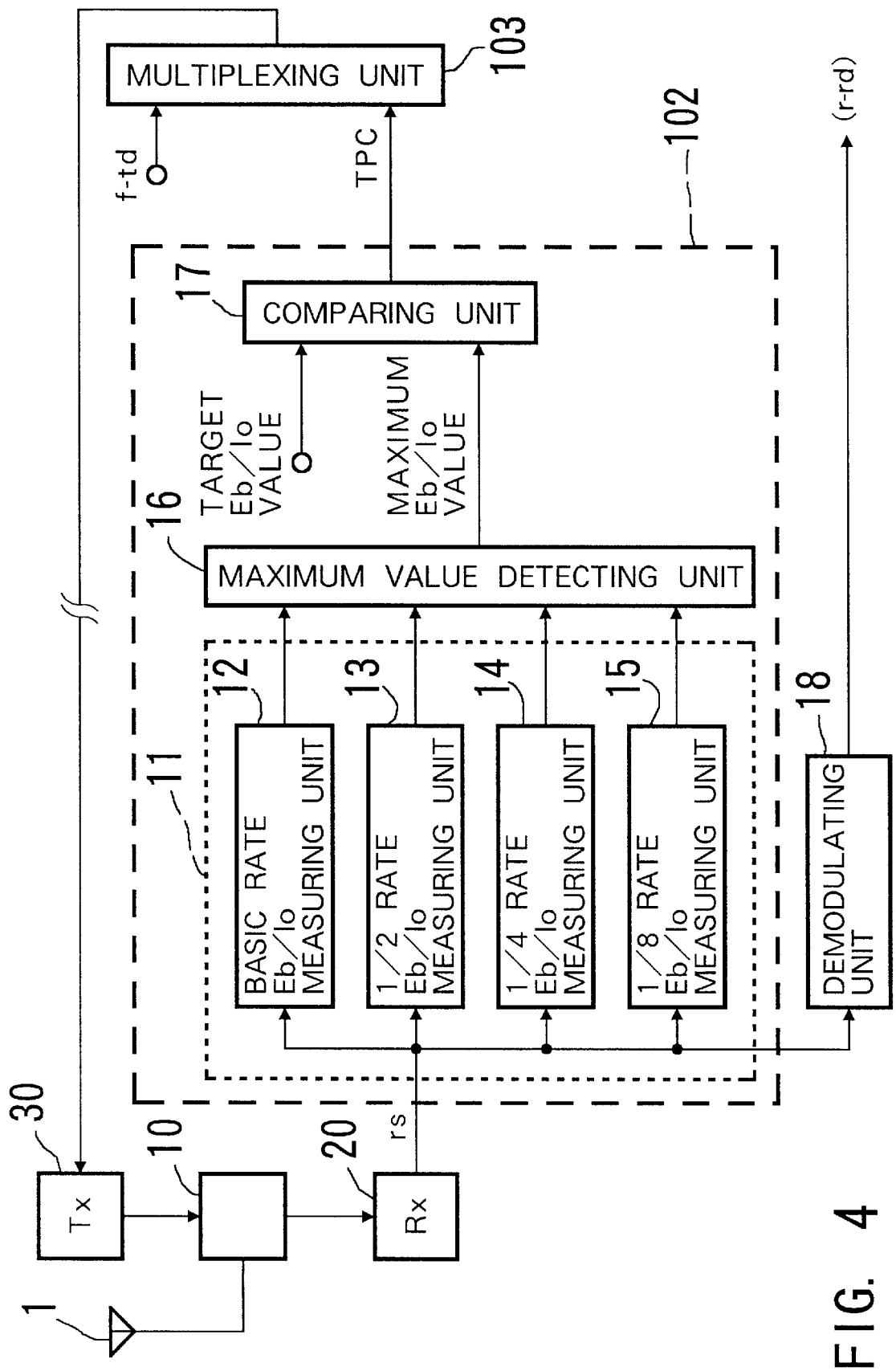
FIG. 4 is a block diagram of the first embodiment of a reception quality estimation circuit for realizing the variable bit rate CDMA transmission electric power controlling system according to the invention.

FIG. 4 is a block diagram showing the first embodiment of the variable bit rate CDMA transmission electric power controlling system of the invention and particularly shows a circuit construction of an embodiment of the reception quality estimation circuit 102 of the base station apparatus shown in, for example, FIG. 2. In the diagram, the same reference numerals as those in FIG. 2 denote the same component elements. A demodulating unit 18 corresponds to the RAKE receiver 100 and demultiplexing unit (DMUX) 101 in FIG. 2.

As shown in FIG. 4, the reception quality estimating circuit 102 includes an Eb/Io calculating circuit 11 for calculating a ratio (Eb/Io) of a signal electric energy per bit Eb to an interference electric power per Hz Io for different bit rates on the basis of the base-band signal rs generated from the radio receiving unit (Rx) 20. The Eb/Io value for each bit rate is output from the Eb/Io calculating circuit 11.

The reception quality estimation circuit 102 further has a maximum value detecting unit 16 for detecting a maximum value of Eb/Io values for the different bit rates from the Eb/Io calculating circuit 11; and a comparing unit 17 for comparing the maximum Eb/Io value from the maximum value detecting unit 16 with a predetermined target Eb/Io value and for outputting a transmission electric power control bit (TPC bit). The Tpc produces a result so that when the maximum Eb/Io value is larger than the target Eb/Io value, a transmission electric power is decreased and, when the maximum Eb/Io value is smaller than the target Eb/Io value, the transmission electric power is increased.

The Eb/Io calculating circuit 11 has a basic rate Eb/Io measuring unit 12 for measuring an Eb/Io value of a basic rate and a ½ rate Eb/Io measuring unit 13 for measuring of an Eb/Io value of ½ rate. Further, the circuit 11 has a ¼ rate Eb/Io measuring unit 14 for measuring an Eb/Io value of ¼ rate and a ⅛ rate Eb/Io measuring unit 15 for measuring an Eb/Io value of ⅛ rate.

The operation of the transmission electric power control in the first embodiment will now be explained.

In FIG. 4, the Eb/Io calculating circuit 11 calculates the ratio (Eb/Io) of the signal electric energy per bit Eb to interference electric power per Hz Io on the basis the base-band signal rs generated from the radio receiving unit (Rx) 20 for all bit rates and outputs the Eb/Io values for respective bit rates to the maximum value detecting unit 16.

That is, the basic rate Eb/Io measuring unit 12 measures and outputs the Eb/Io value for the basic rate. The ½ rate Eb/Io measuring unit 13 measures and outputs the Eb/Io value for the ½ rate. Further, the ¼ rate Eb/Io measuring unit 14 measures and outputs the Eb/Io value for the ¼ rate. The ⅛ rate Eb/Io measuring unit measures and outputs the Eb/Io value for the ⅛ rate.

The maximum value detecting unit 16 detects the maximum value among the Eb/Io values for all bit rates from the Eb/Io calculating circuit 11 and outputs the maximum value to the comparing unit 17. The comparing unit 17 compares the maximum Eb/Io value with the target Eb/Io value (target value) and outputs the instruction signal, namely, the transmission electric power control bit (TPC bit). The TPC bit is used so that when the maximum Eb/Io value is larger than the target Eb/Io value, the transmission electric power is decreased and, when the maximum Eb/Io value is smaller than the target Eb/Io value, the transmission electric power is increased the multiplexing unit 103.

The multiplexing unit 103 multiplexes the TPC bit from the comparing unit 17 with the forward transmission data (f-td) and transmits the resultant data to a radio transmitting unit (Tx) 30. The unit 30 modulates the multiplexed data from the multiplexing unit 103, converts a frequency of the data, and transmits the resultant data as a forward link or a reverse link at a transmission electric power based on the transmission electric power control bit.

The demodulating unit 18 transmits the reverse reception data (r-rd) obtained by demodulating the reception base-band signal rs from the radio receiving unit (Rx) 20. In the Eb/Io calculating circuit 11, maximum value detecting unit 16, and comparing unit 17, the transmission bit rate is changed by using a frame having a time length of, for example, 10 msec to 80 msec as a unit and the process is executed by using a slot which is obtained by dividing one frame into a plurality of slots which have a time length of at least 0.5 msec to 2.5 msec as a unit.

As mentioned above, since the Eb/Io values of a plurality of bit rates are measured as indices of the reception quality and the transmission electric power control is executed by using the maximum value in the first embodiment, it is unnecessary to previously know the bit rate in use for transmission and it is possible to rapidly form the transmission electric power control bit for every slot as a unit of the transmission electric power control.

Particularly, it can be applied as a variable bit rate transmitting system without being limited by a method due to the turn ON/OFF for every slot. In combination with the variable bit rate transmitting method of changing the spreading factor depending upon the bit rate, the transmission efficiency is not deteriorated at even a low bit rate and an occurrence of hazard noise for, for example, a hearing aid or medical instruments can be prevented. In combination with the variable rate transmitting system of varying ON time of the slot content depending upon the bit rate, measuring time of the reception quality can be extended, so that the precision of the transmission electric power control can be improved.

The second embodiment of the reception quality discriminating circuit will now be explained with reference to FIG. 5.

Figure 5:
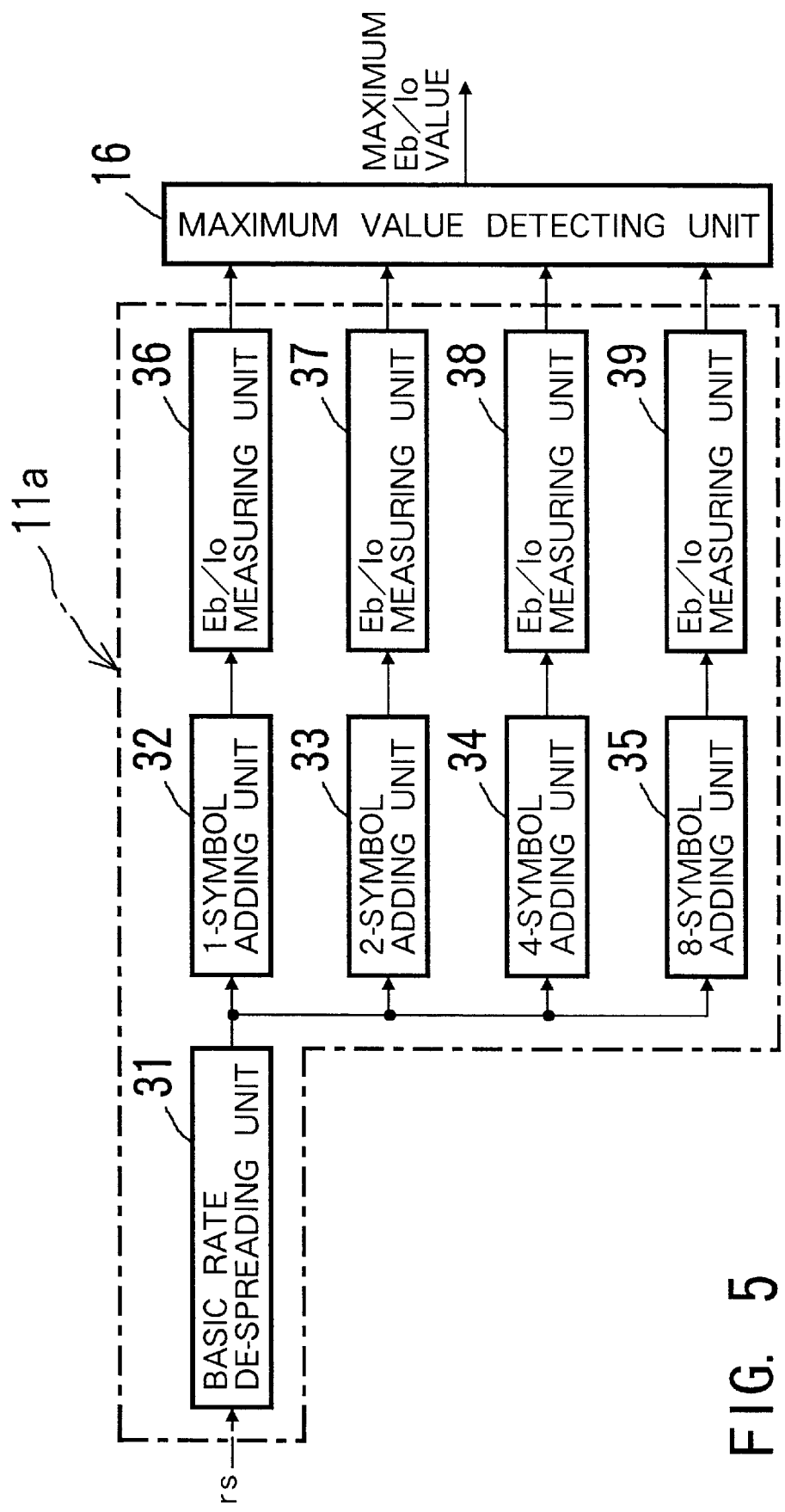
FIG. 5 is a block diagram showing a main portion of the second embodiment of the reception quality estimation circuit according to the invention.

FIG. 5 is a block diagram showing a construction of the Eb/Io calculating circuit in the second embodiment. In the diagram, an Eb/Io calculating circuit 11a has a basic rate de-spreading unit 31 for de-spreading the base-band signal rs generated by the radio receiving unit (Rx) 20 shown in FIG. 4; a 1-symbol adding unit 32, a 2-symbol adding unit 33, a 4-symbol adding unit 34, and a 8-symbol adding unit 35 for adding the number of transmission symbols repeated depending upon the bit rate from the output signal of the basic rate de-spreading unit 31; and Eb/Io measuring units 36, 37, 38, and 39 for measuring the Eb/Io values for respective symbols added by the 1-symbol adding unit 32 to 8-symbol adding unit 35, respectively.

Figure 6:
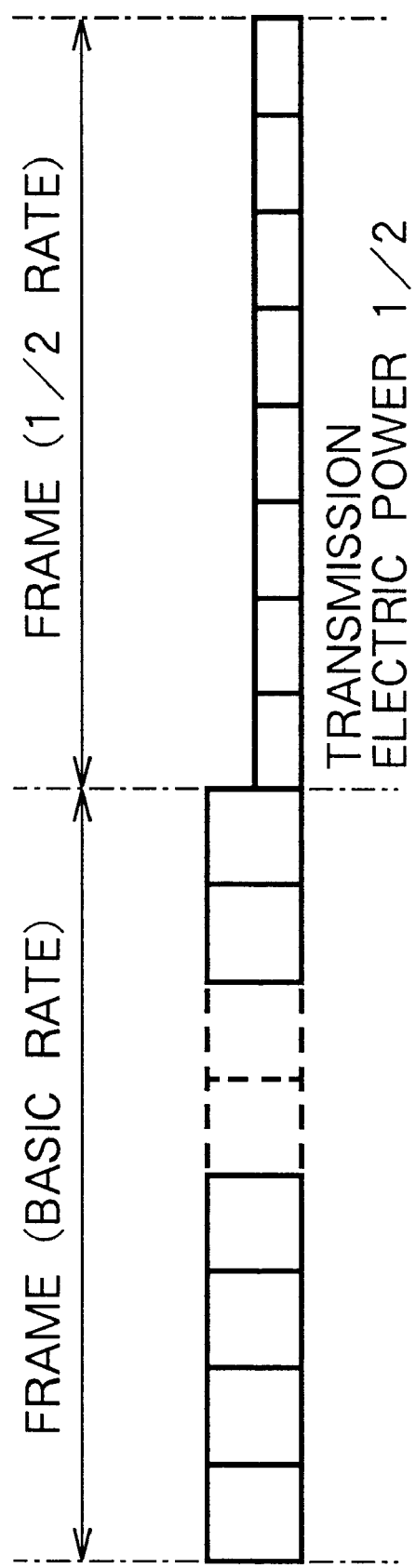
FIG. 6 is a diagram for explaining a transmission electric power control according to the second embodiment.

FIG. 6 is a diagram for explaining the transmission electric power control in the second embodiment. In FIGS. 5 and 6, in the variable bit rate transmission of the second embodiment, a part of the Eb/Io measurement for the bit rates is common by using a situation that when the bit rate is decreased, the same symbol is repetitively transmitted.

The reception base-band signal rs from the radio receiving unit (Rx) 20 (refer to FIG. 4) is supplied to the basic rate de-spreading unit 31. The signal is de-spread at the basic rate by the unit 31. A de-spread signal from the basic rate de-spreading unit 31 is supplied to the 1-symbol, 2-symbol, 4-symbol, and 8-symbol adding units 32, 33, 34, and 35, respectively. In each of the units, the number of symbols repeated depending upon the bit rate is added.

The Eb/Io measuring units 36, 37, 38, and 39 execute the Eb/Io measurements for the symbols added by the 1-symbol adding unit 32 to 8-symbol adding unit 35 and output the resultant values to the maximum value detecting unit 16. In this case, the processes subsequent to that of the maximum value detecting unit 16 are substantially the same as those in the first embodiment explained with reference to FIG. 4.

Various methods are known for measurement of the Eb/Io serving as an index of the reception quality. In the CDMA, in order to increase a communication capacity, it is normal to execute the operation at an extremely low Eb/Io value. As a method of measuring the extremely low Eb/Io value at a high precision, for example, a reception signal is inversely modulated to provide a carrier component and an interference component. Regarding the slot content mean value (or a gravity) of the inverse modulation signal as a carrier component (desired signal component) and a variance as an interference component, the signal electric energy per bit Eb is obtained from a square value of the mean value, and the interference electric power per Hz Io is obtained from the variance.

In the variable bit rate transmission, as shown in FIG. 6, a first frame is transmitted at the basic rate (maximum bit rate) and a second frame is transmitted at a bit rate that is ½ of the basic rate. Each slot of the second frame in which the bit rate is ½ is transmitted by an electric power that is ½ as compared with that of a slot of the first frame transmitted at the basic rate. The transmission is continuously executed without turning ON/OFF the transmission in the frame or slot. In order to simplify the explanation, a changed portion of the transmission electric power on a slot unit basis by the transmission electric power control is omitted.

The third embodiment of the reception quality estimation circuit will now be explained with reference to FIG. 7.

Figure 7:
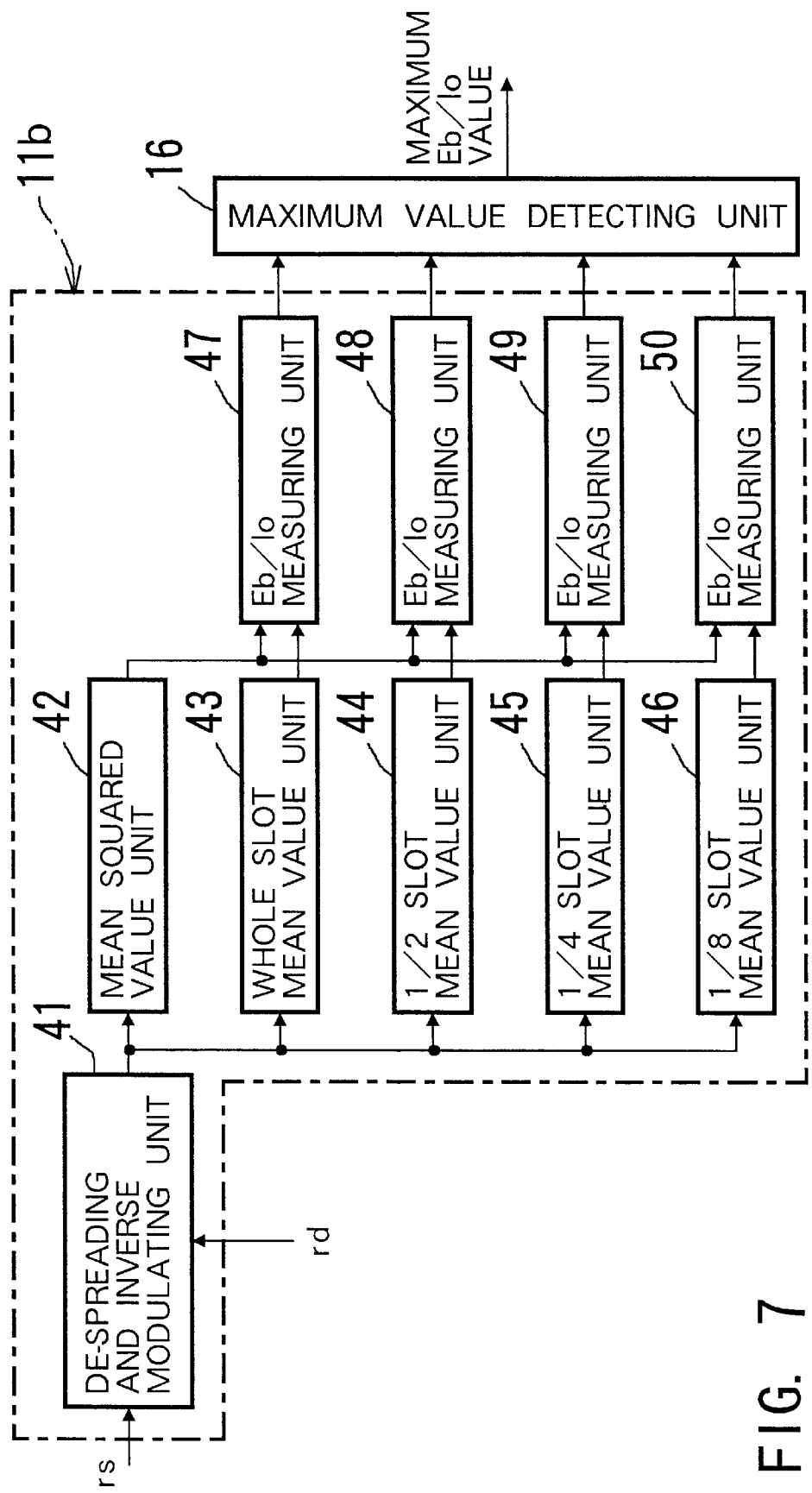
FIG. 7 is a block diagram showing a main portion of the third embodiment of the reception quality estimation circuit according to the invention.

FIG. 7 is a block diagram showing a construction of an Eb/Io calculating circuit in the third embodiment. In the diagram, an Eb/Io calculating circuit 11b has a de-spreading and inverse modulating unit 41 for de-spreading the base-band signal is from the radio receiving unit (Rx) 20 and executing an inverse modulation to the signal rd by the reverse, reception data (r-rd) from the demodulating unit 18 in FIG. 4, thereby eliminating a modulation component; and a mean squared value unit 42 for calculating a mean squared value of the reception signal in which the modulation component was eliminated of the de-spreading and inverse modulating unit 41 in a slot interval.

The Eb/Io calculating circuit 11b further has a whole slot mean value unit 43 for calculating a mean value of a whole slot interval; a ½ slot mean value unit 44 for calculating a mean value of ½ slot interval; a ¼ slot mean value unit 45 for calculating a mean value of ¼ slot interval; and a ⅛ slot mean value unit 46 for calculating a mean value of ⅛ slot interval.

The Eb/Io calculating circuit 11b also has an Eb/Io measuring unit 47 for outputting the Eb/Io value based on the mean squared value generated by the mean squared value unit 42 and the mean value of the whole slot interval from the whole slot mean value unit 43 to the maximum value detecting unit 16; and an Eb/Io measuring unit 48 for outputting the Eb/Io value based on the mean squared value generated by the mean squared value unit 42 and the mean value of the ½ slot interval from the ½ slot mean value unit 44 to the maximum value detecting unit 16.

The Eb/Io calculating circuit 11b further has an Eb/Io measuring unit 49 for outputting the Eb/Io value based on the mean squared value generated by the mean squared value unit 42 and the mean value of the ¼ slot interval from the ¼ slot mean value unit 45 to the maximum value detecting unit 16; and an Eb/Io measuring unit 50 for outputting the Eb/Io value based on the mean squared value generated by the mean squared value unit 42 and the mean value of the ⅛ slot interval from the ⅛ slot mean value unit 46 to the maximum value detecting unit 16.

Figure 8:
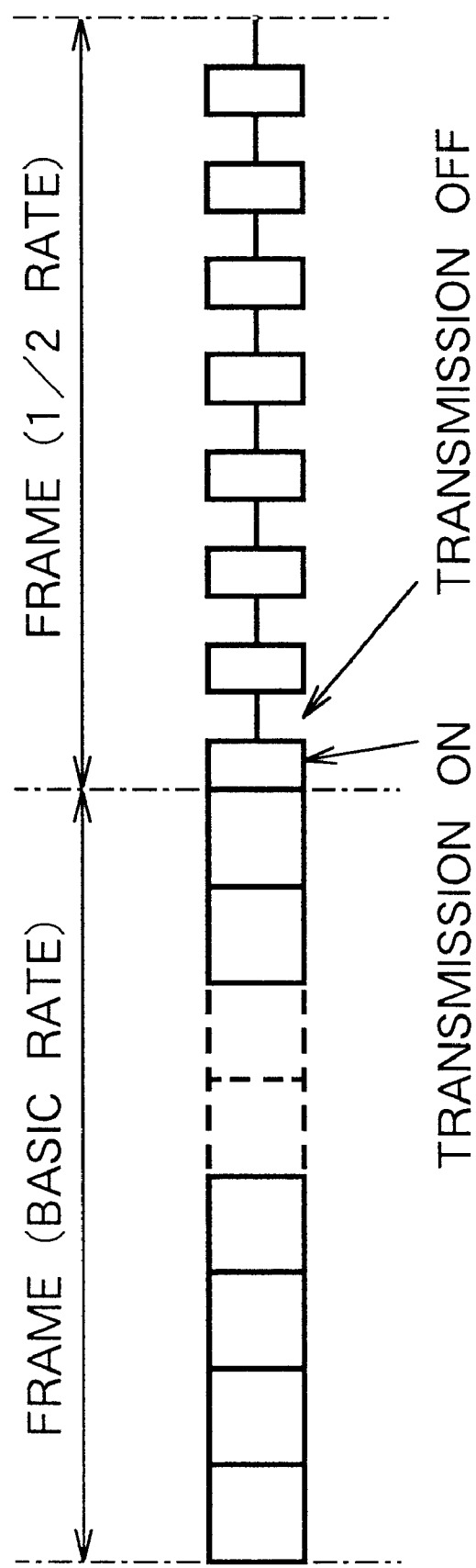
FIG. 8 is a diagram for explaining a transmission electric power control according to the third embodiment.

FIG. 8 is a diagram for explaining the transmission electric power control in the operation of the third embodiment. In FIGS. 7 and 8, the Eb/Io calculating circuit 11b transmits or receives only parts of the slots depending upon the bit rate and, particularly, sets the maximum bit rate to a basic rate, varies the bit rate to ½, ¼, and ⅛ of the basic rate, and measures the Eb/Io values in the variable rate transmissions in which the intervals of the slot in which the transmission is ON are set to ½, ¼, and ⅛ of one slot, respectively.

In FIG. 7, the de-spreading and inverse modulating unit 41 de-spreads the reception base-band signal rs from the radio receiving unit (Rx) 20 and also inversely modulates the signal with the demodulation data rd, thereby eliminating the modulation component. A mean squared value of the reception signal with the modulation eliminated of the de-spreading and inverse modulating unit 41 is calculated in the slot interval by the mean squared value unit 42. The mean squared values are commonly extracted at all of the bit rates. In the variable bit rate transmitting system, although the transmission ON interval includes the desired signal component and interference component, only the interference component of the transmission OFF interval is included, so that the Eb/Io measurement can be executed with all of the reception signals (reception base-band signal rs) in the slot.

In this instance, the dispersion can be obtained as a difference between a mean squared value, and a square of the mean value. The mean squared value is obtained by squaring samples, summing the squared value, and then dividing the summed value by the number of samples. The square of the mean value is a value of a sum obtained in such a manner that when the reception base-band signal rs is shown as a complex number in which a same phase component is set to a real number portion and an orthogonal component is set to an imaginary number portion, after a mean value of the complex number is obtained, a square of the real number portion and a square of the imaginary number are added.

As for the mean squared value, it is a calculation common to all of the bit rates. As for the mean value, since the calculation of only the portion in which the transmission is ON is executed, the interval in which the mean value is obtained depending upon the bit rate is different.

A specific calculation example will now be explained.

It is assumed that the sample after completion of the de-spreading diffusion and inverse modulation is set to ri (i=1 to M), the sample ri is a complex number in which a same phase component is set to a real number portion and an orthogonal component is set to an imaginary portion, and M is set to the number of samples per slot. A mean squared value P is shown in Expression (1).

$$P = \Sigma_{i=1-M} |ri|^2 / M \quad (1)$$

A mean value of a rate of 1/N of the basic rate is shown by Expression (2).

$$AV(N) = \Sigma_{i=1-M/N} ri / (M/N) \quad (2)$$

Further, the Eb/Io value (N) for the bit rate of 1/N of the basic rate is shown by Expression (3).

$$Eb/Io(N) = |AV(N)|^2 / \{P - |AV(N)|^2 / N\}. \quad (3)$$

In the calculation, the reason why the square of the mean value is divided by N is that a desired signal is included in only the interval of 1/N of the slot and only the interference component is included in other intervals, namely, it is assumed that the electric power of the desired signal component is equal to 0.

In the above embodiments, when the reception quality is estimated, the mean squared value of the mean value of the signal after completion of the de-spreading and inverse modulation is set to a value proportional to the reception signal electric energy per bit (Eb), the distribution is set to a value proportional to the interference electric power per Hz (Io), and an estimate of the Eb/Io is calculated for every bit rate.

Figure 9:
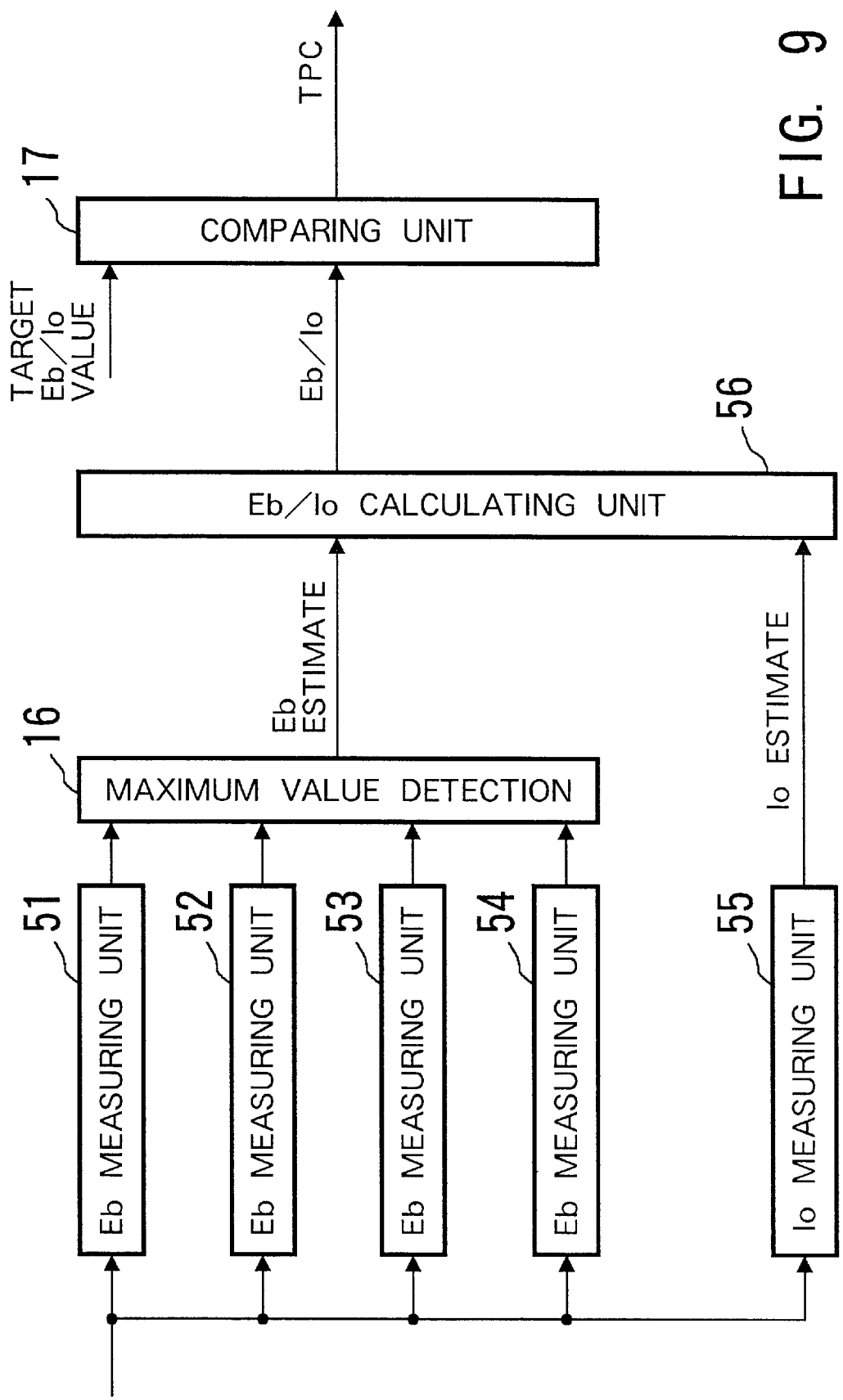
FIG. 9 is a block diagram showing the fourth embodiment of the reception quality estimation circuit according to the invention.

This is because, physically, the interference wave electric power per Hz (Io) is a value which doesn't depend on the bit rate but an estimated expression of the interference wave electric power (Io) per Hz is different depending on a bit rate that is assumed when Io is estimated from the reception signal. In case of the variable bit rate transmitting system in which the interference wave electric power is sufficiently large as compared with the desired signal electric power and the transmission electric power is constant in one slot (for example, the variable bit rate transmitting method of changing the spreading factor depending upon the bit rate and also changing the transmission electric power in inverse proportion to the spreading factor), the estimate of the interference wave electric power that does not depend on the bit rate can be used. That is, it is a method using the electric power of the reception signal before the de-spreading, namely, the mean squared value of the signal before the de-spreading as an estimate of the interference electric power per Hz (Io). When using the method, a reception quality estimation circuit as shown in FIG. 9 is considered.

Eb measuring units 51, 52, 53 and 54 for estimating the reception signal electric energy Eb for all of the bit rates and an Io measuring unit 55 for estimating the interference wave electric power (Io) by a method which does not depend on the bit rate are provided. The maximum value detecting unit 16 obtains the maximum value of the reception signal electric energies Eb obtained for all bit rates. An Eb/Io calculating unit 56 calculates the Eb/Io from the obtained maximum value of Eb and Io estimated by the Io measuring unit 55. The comparing unit 17 compares the Eb/Io value with the target Eb/Io. As mentioned above, the reception quality can thus be estimated.

As mentioned above, according to one aspect of the variable rate CDMA transmission electric power controlling system of the invention, since the maximum value of the Eb/Io values measured depending upon a plurality of bit rates obtained from the reception base-band signal is obtained and the transmission electric power control is executed, it is unnecessary to previously know the bit rate, so that it is possible to rapidly form the transmission electric power control bit rate for every slot serving as a unit of the transmission electric power control. Consequently, the transmitting quality is not deteriorated, the spreading factor is changed depending upon the bit rates, and when it is applied to the variable rate transmitting method of changing the transmission electric power in inverse proportion to the spreading factor and transmitting and the variable rate transmission in which only parts of the slots are transmitted in correspondence to the bit rate, a high-precision transmitting electric power control can be executed.

In the above embodiments, a transmission electric power controlling system according to the present invention has been explained as being applicable to a base station apparatus and a mobile terminal. It is to be noted, however, that the present invention claims not only the transmission electric power controlling system but also a base station apparatus and/or a mobile terminal itself adopting the transmission electric power controlling system. The present invention is applicable to a forward link and a reverse link in the same manner.

What is claimed is:

1. A variable bit rate CDMA transmission electric power controlling system for a receiving device where a plurality of transmission bit rates are used during CDMA transmission, said system producing a transmission electric power control signal indicating whether power of signals sent to said receiving device by a transmitting device should be altered, said system comprising:

a reception quality estimating circuit which estimates, for each of said transmission bit rates, a reception quality based on a base-band signal received by said receiving device thereby producing an estimated reception quality;

a transmission electric power control circuit which produces said transmission electric power control signal based on said estimated reception quality; and a transmitter which sends said transmission electric power control signal to said transmitting device.

2. A variable bit rate CDMA transmission electric power controlling system according to claim 1, wherein said reception quality estimating circuit measures a ratio of a signal electric energy per bit to an interference electric power per thereby producing an Eb/Io value and obtains a maximum Eb/Io value.

3. A variable bit rate CDMA transmission electric power controlling system according to claim 1 where said receiving device is a mobile terminal.

4. A variable bit rate CDMA transmission electric power controlling system according to claim 1 where said receiving device is a base station.

5. A variable bit rate CDMA mobile telephone system comprising a variable bit rate CDMA mobile terminal device including a transmission electric power controlling system and a base station apparatus including a transmission electric power controlling system, said transmission electric power controlling system producing a transmission electric power control signal indicating whether power of signals received from a transmitting device should be altered, said transmission electric power controlling system comprising:

a reception quality estimating circuit which estimates, for each of said of transmission bit rates, a reception quality based on a base-band signal received thereby producing an estimated reception quality;

a transmission electric power control circuit which produces said transmission electric power control signal based on said estimated reception quality; and a transmitter which sends said transmission electric power control signal to said transmitting device.

6. A variable bit rate CDMA transmission power controlling system for a receiving device where a plurality of transmission bit rates are used during CDMA transmission, said system producing a transmission electric power control signal indicating whether power of signals sent to said receiving device by a transmitting device should be altered, said system comprising:

a reception quality estimating circuit which estimates, for each of said bit rates, a reception quality based on a base-band signal received by said receiving device by measuring a ratio of a signal electric energy per bit to an interference electric power value for each of said bit rates thereby producing Eb/Io values;

a maximum value detecting circuit which detects a maximum value of said Eb/Io values;

a comparator which compares said maximum value with a reference value to produce said transmission electric power control signal; and a transmitter which sends said transmission electric power control signal to said transmitting device.

7. A variable bit rate CDMA transmission electric power controlling system for a receiving device where a plurality of transmission bit rates are used during CDMA transmission, said system producing a transmission electric power control signal indicating whether power of signals sent to said receiving device by a transmitting device should be altered, said system comprising:

a receiver which receives a signal, converts said signal to a reception base-band signal, and outputs said reception base-band signal;

an Eb/Io calculator which calculates a ratio of a signal electric energy per bit to an interference electric power for each said transmission bit rate on the basis of said reception base-band signal thereby producing Eb/Io values;

a maximum value detecting circuit which determines a maximum value of said Eb/Io values;

a comparator which compares said maximum value with a target value and outputs said transmission electric power control signal in response thereto;

a transmitter which sends said transmission electric power control signal to said transmitting device.

8. The system according to claim 7 further comprising:

a multiplexor which multiplexes said transmission electric control signal from said comparator with transmission data and outputs resultant data;

said transmitter which modulates said resultant data from said multiplexor thereby producing multiplexed data, converts a frequency of said multiplexed data thereby producing converted data, an transmits said converted data; and a demodulator which demodulates said reception base-band signal received from said receiver.

9. The system according to claim 7, wherein said Eb/Io calculator includes:

a basic rate Eb/Io measuring unit which measures an Eb/Io value for a basic rate of said reception base-band signal; and a plurality of Eb/Io measuring units which measure Eb/Io values for said plurality of bit rates of said reception base-band signal.

10. The system according to claim 7, wherein in each of said Eb/Io calculator, maximum value detecting circuit, and comparator, the transmission bit rate is changed by using a frame having a time length of at least 10 msec to 80 msec as a unit and a process is executed by using a slot which is obtained by dividing one frame into a plurality of slots which have a time length of at least 0.5 msec to 2.5 msec as a unit.

11. The system according to claim 7, wherein a spreading factor of said reception base-band signal is changed depending upon said bit rate, and said transmission electric power control signal is changed based on said spreading factor.

12. The system according to claim 11, wherein said bit rate is changed within a range of one integer (N) of the base rate by setting the maximum rate as a base rate and, when the bit rate is equal to 1/N of the base rate, the same data is repeated N times and is transmitted, the spreading factor is changed, and the transmission electric power is changed in inverse proportion to N.

13. The system according to claim 10, wherein a time ratio in which transmission is ON in said slot is changed in proportion to said bit rate.

14. The system according to claim 12, wherein said Eb/Io calculator includes:

a basic rate de-spreading unit which de-spreads said reception base-band signal to produce a de-spread signal with one of said bit rates;

a plurality of symbol adding units which add a number of transmission symbols to said de-spread signal depending upon said bit rate of said de-spread signal; and a plurality of Eb/Io measuring units which produce said Eb/Io values for said transmission symbols added by symbol adding units.

15. The system according to claim 13, wherein said Eb/Io calculator comprises:

a de-spreading and inverse modulating unit which de-spreads said reception base-band signal and inversely modulates said reception base-band signal, thereby eliminating a modulation component of said reception base-band signal;

a mean squared value unit which calculates a mean squared value of said reception base-band signal from said de-spreading and inverse modulating unit in one of said slots;

a plurality of mean value calculating units which obtain mean values of a transmission ON interval in slots corresponding to each bit rate from said reception base-band signal output from said de-spreading and inverse modulating unit; and a plurality of Eb/Io measuring units which produce said Eb/Io values for each bit rate by using said mean squared value from said mean squared value unit and said mean values from said plurality of mean value calculating units.

16. The system according to claim 9, wherein said Eb/Io measuring units comprise:

a ½ rate Eb/Io measuring unit which measures an Eb/Io value for a ½ rate of said reception base-band signal;

a ¼ rate Eb/Io measuring unit which measures an Eb/Io value for a ¼ rate of said reception base-band signal; and a ⅛ rate Eb/Io measuring unit which measures an Eb/Io value for a ⅛ rate of said reception base-band signal.

17. The system according to claim 14, wherein said symbol adding units comprise:

a 1-symbol adding unit which adds one symbol of a transmission repeated depending upon the bit rate of said de-spread signal;

a 2-symbol adding unit which adds two symbols of said transmission repeated depending upon the bit rate of said de-spread signal;

a 4-symbol adding unit which adds four symbols of said transmission repeated depending upon the bit rate of said de-spread signal; and a 8-symbol adding unit adding eight symbols of said transmission repeated depending upon the bit rate of said de-spread signal.

18. The system according to claim 15, wherein said mean value calculating units comprise:

a whole slot mean value unit which calculates a mean value of a whole slot interval of said reception base-band signal;

a ½ slot mean value unit which calculates a ½ slot interval mean value of said reception base-band signal;

a ¼ slot mean value unit which calculates a ¼ slot interval mean value of said reception base-band signal; and a ⅛ slot mean value unit which calculates a ⅛ slot interval mean value of said reception base-band signal.

19. The system according to claim 6, wherein said receiving device is a mobile telephone system using a direct spread code-division multiple accessing system.

20. A method for indicating whether the power of signals sent by a transmitting device to a receiving device in a CDMA transmission should be altered, wherein a plurality of transmission rates are used during said CDMA transmission, said method comprising:

estimating reception quality for each of said transmission bit rates based on a base-band signal received by said receiving device thereby producing an estimated reception quality;

producing a transmission electric power control signal based on said estimated reception quality; and sending said transmission electric power control signal to said transmitting device.

21. A method for indicating whether power of signals sent by a transmitting device to a receiving device in a CDMA transmission should be altered, wherein a plurality of transmission rates are used during said CDMA transmission, said method comprising:

measuring a ratio of a signal electric energy per bit to an interference electric power value for each of said transmission bit rates based upon a reception base-band signal received by said receiving device thereby producing Eb/Io values;

obtaining a maximum value of said Eb/Io values;

producing a transmission electric power control signal based upon said maximum value; and sending said transmission electric power control signal to said transmitting device.

* * * * *